United States Patent [19]
Feustel et al.

[11] 3,869,017
[45] Mar. 4, 1975

[54] ENGINE MOUNTING AND ENERGY ABSORBING FRAME FOR A MOTOR VEHICLE

[75] Inventors: James R. Feustel, Taylor; Kenneth L. Hoyt, Farmington; Jonas Valukonis, Detroit; John J. Corcoran, Ann Arbor, all of Mich.

[73] Assignee: Ford Motor Company, Dearborn, Mich.

[22] Filed: Oct. 5, 1972

[21] Appl. No.: 295,378

[52] U.S. Cl. ................ 180/82 R, 180/64 R, 248/9
[51] Int. Cl. .............................................. B60r 21/00
[58] Field of Search ........ 180/64 R, 64 L, 91, 82 R; 280/106; 293/63; 248/9

[56] References Cited
UNITED STATES PATENTS

| | | | |
|---|---|---|---|
| 2,102,120 | 12/1937 | Hevenor | 280/106 R |
| 2,517,860 | 8/1950 | Forgy | 180/91 X |
| 3,437,367 | 4/1969 | Blank | 293/60 X |
| 3,525,413 | 8/1970 | Kripke et al. | 280/106 R |
| 3,589,466 | 6/1971 | Dudley | 180/64 L X |
| 3,638,748 | 2/1972 | Tixler | 280/106 R X |
| 3,718,304 | 2/1973 | Schulz et al. | 180/64 R X |
| 3,729,221 | 4/1973 | Granig | 293/60 X |

OTHER PUBLICATIONS
N. Baracos and A. Rhodes, SAE Paper, No. 690004, Jan., 1969, "Ford 'S' Frame," page 11.

*Primary Examiner*—David Schonberg
*Assistant Examiner*—Torrance L. Siemens
*Attorney, Agent, or Firm*—Clifford L. Sadler; Keith L. Zerschling

[57] ABSTRACT

This disclosure relates to an impact absorbing system for a motor vehicle. In the preferred embodiment, the system includes a unique energy absorbing frame and engine mounting construction. The frame has a plurality of plastically deformable energy absorbing sections. A vehicle body is supported on the frame. Break-away engine mounts connect the vehicle's engine to the frame. When an impact load is exerted against the forward end of the frame, the inertia load of the engine will cause frangible elements in the break-away mounts to fracture and the engine to separate from the frame. With this construction, the inertia load of the engine will not be imposed upon the energy absorbing frame sections whereby those sections need support only the inertia load of the vehicle body.

2 Claims, 13 Drawing Figures

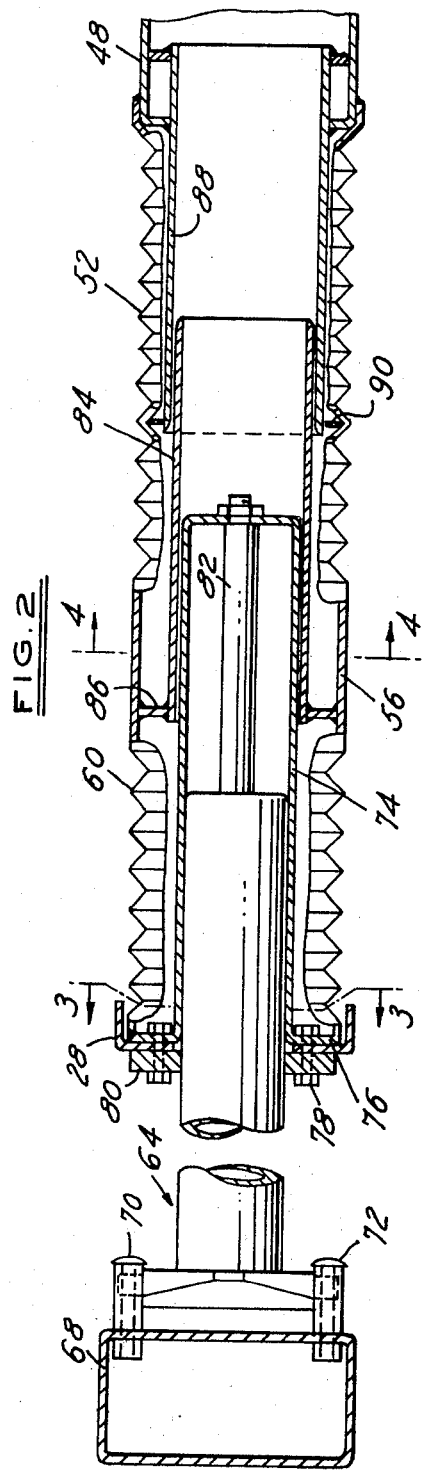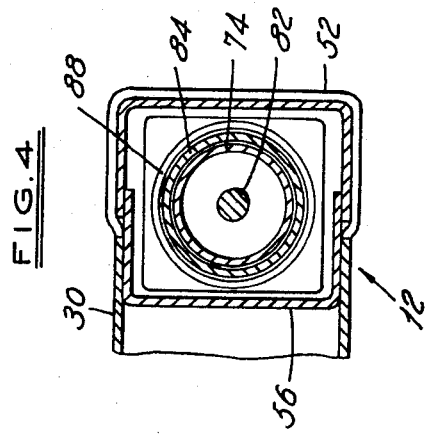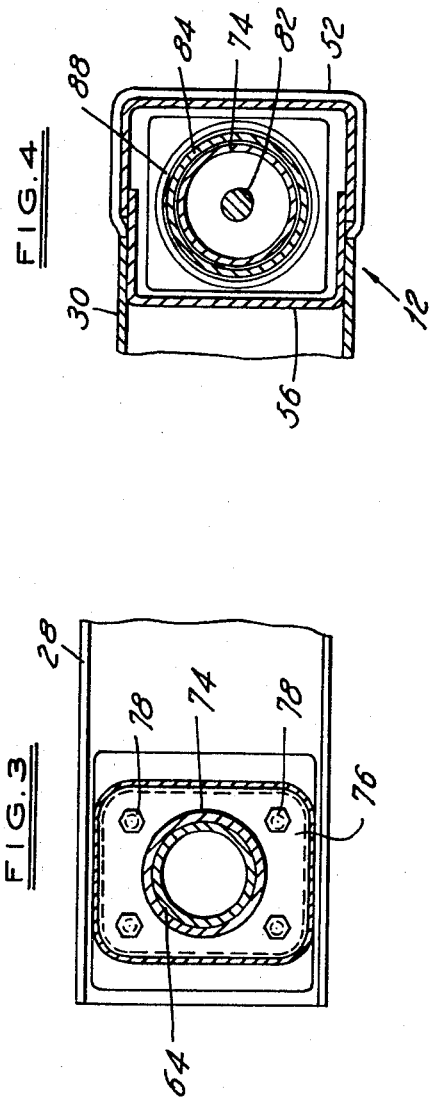

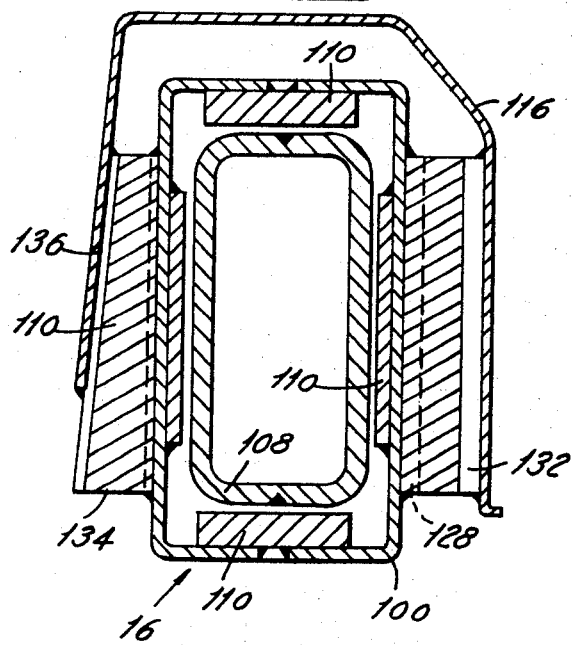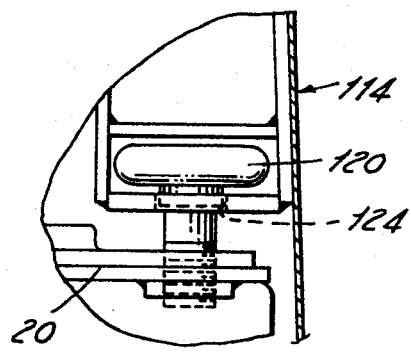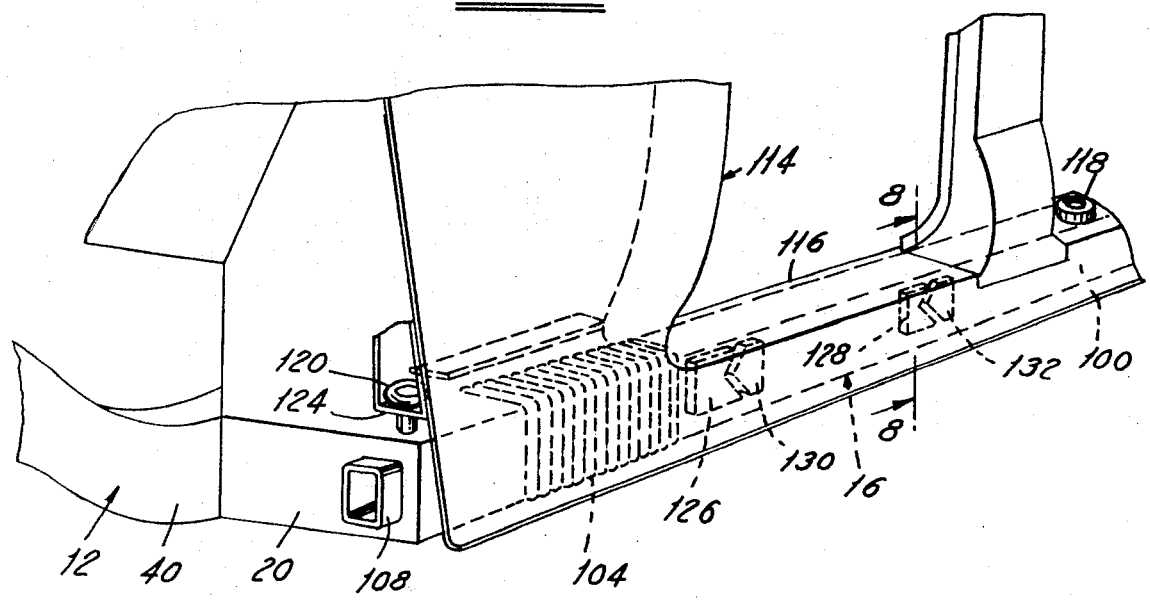

3,869,017

ENGINE MOUNTING AND ENERGY ABSORBING FRAME FOR A MOTOR VEHICLE

BACKGROUND OF THE DISCLOSURE

The present invention relates to energy absorbing systems for motor vehicles, and more particularly to a vehicle having an energy absorbing frame that supports a vehicle body and an engine. The frame is constructed to shed the engine and support the inertia load of the vehicle body in the event an impact load is imposed upon it.

SUMMARY OF THE DISCLOSURE

In accordance with the presently preferred embodiment of this invention, a motor vehicle includes a frame having a plurality of plastically deformable energy absorbing sections. Mounting means supports a vehicle body and an engine upon the frame. The mounting means for the engine provides support in a conventional fashion under ordinary conditions. The motor mounts have a break-away construction whereby when an impact load is imposed upon the frame, the inertia of the engine will cause the motor mounts to separate from the frame. Under these conditions, the inertia load of the engine will not be imposed upon the energy absorbing frame sections. These frame sections will, thus, be free to support the inertia load of the vehicle body and will not have to carry the additional load of the engine mass.

In the disclosed embodiment, three motor mounts are provided having brackets secured to the frame by fasteners employing frangible elements. The frangible elements are constructed to fracture under a force that exceeds a predetermined minimum to thereby permit the engine to separate from the frame in the event of a major impact.

The break-away engine mounts are constructed to support the engine against rearward displacement relative to the frame in the event a rearwardly directed impact load is directly imposed upon it.

BRIEF DESCRIPTION OF THE DRAWINGS

The many objects and advantages of an energy absorbing system for a motor vehicle constructed in accordance with the present invention will become apparent upon consideration of the following detailed description and the accompanying drawings, in which:

FIG. 2 is a side elevational view, partly in section, of the left energy absorbing forward side rail and bumper support of the frame assembly of FIG. 1;

FIG. 3 is a sectional view of the left forward frame side rail taken along section line 3—3 of FIG. 2;

FIG. 4 is another sectional view of the left forward frame side rail taken along section line 4—4 of FIG. 2;

FIG. 5 is a perspective view of the left intermediate side rail portion of the frame assembly, a portion of the vehicle body and the body mounting system;

FIG. 7 is a front elevational view of a T-bolt which interconnects the body and frame and which forms a part of the secondary body support system of FIG. 5;

FIG. 8 is a sectional view taken along section line 8—8 of FIG. 5;

DETAILED DESCRIPTION OF THE PREFERRED EMBODIMENT

Figure 1:
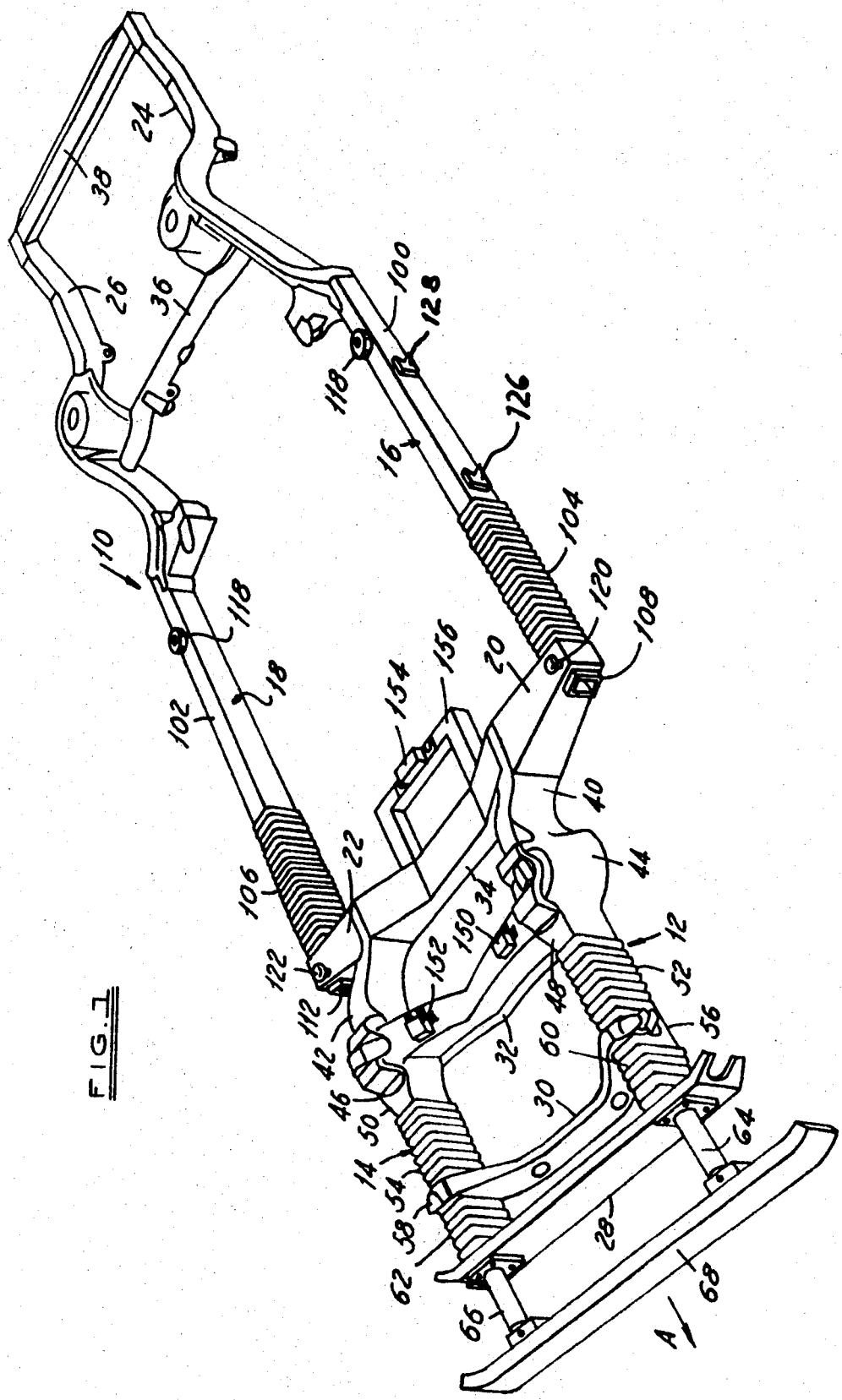
FIG. 1 is a perspective view of a preferred form of an energy absorbing vehicle frame assembly.

Referring now to the drawings, wherein the presently preferred embodiment of this invention is illustrated, FIG. 1 discloses a motor vehicle frame assembly 10 having frame side rails with a plurality of plastically deformable energy absorbing sections. The drawings disclose an energy absorbing system for a motor vehicle that includes an energy absorbing frame, a bumper support system, a dual body support system and an engine mounting system.

The Frame Assembly

The frame assembly 10 includes left and right forward side rail sections 12 and 14. Left and right intermediate side rails 16 and 18 are connected to the left and right forward side rails 12 and 14 by left and right torque boxes 20 and 22. Rearward side rails 24 and 26 have forward ends that are splayed outwardly and joined to the rear ends of the intermediate side rails 16 and 18.

The forward frame side rails 12 and 14 are interconnected by frame cross members 28, 30 and 32. The torque boxes 20 and 22 are interconnected by a frame cross member 34. The rear side rails 24 and 26 are interconnected by frame cross members 36 and 38.

The forward frame side rails 12 and 14 are constructed to receive the suspension springs and the suspension arms of the suspension system for the vehicle's front wheels. Similarly, the rear side rails 24 and 26 are adapted to receive the rear coil springs and the suspension arms which are connected to the rear axle.

In addition to supporting the suspension components, vehicle body, engine and driveline during normal vehicle operation, the frame assembly 10 performs an energy absorbing function in the event an impact load is imposed upon it.

Forward Frame Structure

The forward frame structure includes frame portions 40 and 42 which extend forwardly from the torque boxes 20 and 22. The frame portions 40 and 42 are provided with bell-shape portions 44 and 46 that are constructed to receive the coil springs of the front suspension system. The frame cross member 32 interconnects the spring supports 44 and 46. The upper suspension arms are pivotally connected to the upper side of the bell-shape spring supports 44 and 46. Short, straight frame portions 48 and 50 extend forwardly from the bell-shape portions 44 and 46. Each of the frame portions 48, 50 has a box-shape in cross section.

Corrugated energy absorbing frame sections 52 and 54 extend forwardly from the frame portions 48 and 50. The forward end of the corrugated sections 52 and 54 are connected to short reinforced box-section rail portions 56 and 58. The frame cross member 30 has its outer ends connected to the reinforced box-sections 56 and 58. Forward corrugated box-section members 60 and 62 are interposed between the reinforced sections 56 and 58 and the outer ends of the frame cross member 28.

Each of the energy absorbing frame portions 52, 54, 60 and 62 has a hollow box shape in cross section. Each side of the box is formed of corrugated sheet metal and is constructed to collapse or crush at a controlled rate when subjected to an impact load that exceeds a predetermined minimum value.

The Bumper Support System and Frame Structure

A pair of hydraulic telescopic shock absorbers 64 and 66 are provided to support a bumper bar 68. The shock absorbers 64 and 66 are supported within the interior of the left and right energy absorbing frame sections 52, 60 and 54, 62, respectively. The bar 68 is spaced forwardly of the first frame cross member 28 by an adequate amount to accommodate bumper deflection under an impact load.

Referring to FIG. 2, wherein the construction of the left side rail 12 is shown in greater detail, the bumper bar 68 is bolted to the left telescopic shock absorber 64 by threaded fasteners 70 and 72.

The absorber 64 includes a support tube 74 disposed within the energy absorbing frame portion 60. The support tube 74 has a flanged forward end 76 that is bolted to the frame cross member 28 by a series of bolts 78. The bolts 78 pass through the flange 76, the cross member 28 and a reinforcing plate 80. The support tube 74 extends rearwardly from the cross member 28 through the interior of the energy absorbing frame portion 60 and the reinforced frame portion 56. A piston rod 82 protrudes from the rearward end of the body of the shock absorber 64 and is secured to the closed end of the absorber support tube 74.

A first guide tube 84 surrounds the absorber support tube 74. The forward end of the guide tube 84 is welded to the structure of the reinforced frame section 56 as shown at 86.

The first guide tube 84 extends rearwardly from the reinforced frame section 56 into the forward end of a second guide tube 88. A support ring 90 positions the forward end of the second tube 88 within the energy absorbing section 52 of the forward left side rail assembly 12. The rearward end of the second guide tube 88 is welded to the frame portion 48.

FIGS. 2, 3 and 4 disclose the details of the construction of the forward left side rail and the associated energy absorbing components. The right forward side rail 14 is similarly constructed and arranged.

This structure provides a means for absorbing minor impacts against the bumper bar and controlled collapse of the forward rail members under a major impact load.

The Body Support System and Frame Structure

The mid frame structure of the frame assembly 10 of FIG. 1 includes energy absorbing means and a primary and secondary body support system.

Referring to FIGS. 1 and 5 through 8, the side rails 16 and 18 include rigid rearward straight portions 100 and 102 that have their rearward ends connected to the rear side rails 24 and 26. The forward end of the side rail portions 100 and 102 are welded to left and right energy absorbing frame sections 104 and 106, respectively. The energy absorbing left and right frame sections 104 and 106 interconnect portions 100 and 102 of side rails 16 and 18 with the torque boxes 20 and 22. Each of the energy absorbing sections 102 and 104 has a hollow box shape in cross sectional view. Each side of the box is formed of corrugated sheet metal that is designed to collapse or crush at a controlled rate for energy absorption when subjected to an impact load above a predetermined minimum value.

Figure 6:
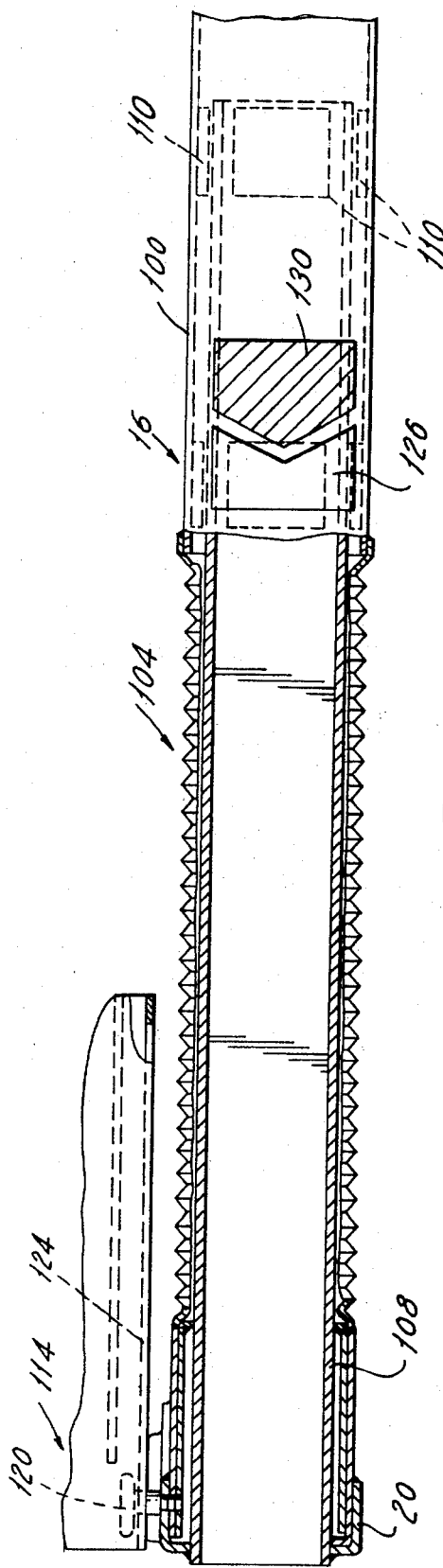
FIG. 6 is a side elevational view, partly in section, of the frame and body structure of FIG. 5.

Referring to FIG. 6, the left intermediate side rail 16 includes a box section guide tube 108 that is fitted within the energy absorbing frame section 104 and has its forward end welded to the left torque box 20. The rear end of the guide tube 108 extends into the interior of the straight side rail portion 100. As seen in FIGS. 6 and 8, plates 110 are provided on the interior of the rail portion 104 to support the rearward end of the guide tube 108 and prevent its rattling during normal vehicle operation.

The right side rail 18 includes, as part of its assembly, a similarly constructed and arranged guide tube 112 that has its forward end welded to the torque box 22. The guide tube 112 extends rearwardly through the interior of the energy absorbing rail section 106 into the straight rail section 102.

Primary and secondary means are provided for supporting the vehicle body upon the intermediate side rails 16 and 18. The vehicle body 114 includes a sill portion 116 adapted to fit over the side rail 16. The vehicle body 114 is supported on the frame 10 by a primary support system which includes a plurality of rubber mounts such as the rubber pucks 118 that are interposed between the frame side rails 16 and 18 and the side sills of the vehicle body. The rubber mounts normally function to limit the transmission of objectionable noise and vibration to the body.

The secondary body support system becomes operational in the event an impact load is exerted against the front of the frame assembly 10. The secondary body support system includes left and right T-bolts 120 and 122. The bolts 120, 122 are secured to the left and right torque boxes 20 and 22 and have their heads spaced upwardly from the upper surface of the torque boxes.

A longitudinally extending guide slot 124 is provided in the forward structure of the body 114 (see FIGS. 5, 6 and 7). The slot 124 is provided in a plate of the sill structure to trap the head of the T-bolt 120. The engagement between the T-bolt 120 and the guide slot 124 of the body structure 114 permits axial displacement of the torque box 20 with respect to the body 114 while preventing upward displacement of the body.

The secondary body support system also includes a pair of longitudinally spaced V-blocks 126 and 128 that are welded to the side of the frame side rail portion 100. The blocks 126 and 128 have rearwardly opening V-shape surfaces. Complementary V-blocks 130 and 132 are welded to the inner sides of the body side sill 116. The blocks 130 and 132 have forwardly pointed V-shape surfaces that are normally longitudinally spaced a short distance from the adjacent surfaces of the frame mounted V-blocks 126 and 128. As seen in FIG. 8, a similar arrangement of blocks is provided on the inner side of the frame portion 100. A block 134, welded to the inner side of the rail portion 100, has a rearwardly opening V-shape surface that is longitudinally spaced a short distance from a V-block 136 welded to the inner surface of the body side sill 116.

The bolts and the interengagement of the several body and frame mounted V-blocks provide a secondary body support system that is effective during a major impact as will be described.

The Engine Mounting System

One-way support means is provided for the vehicle engine 148. Referring now to FIG. 1 and FIGS. 9 to 13, an engine support system is shown that permits the vehicle's power plant 148 to operate in a normal fashion under normal circumstances but which permits the engine to be displaced forwardly with respect to the frame 10 in the event an impact load is exerted upon the frame that exceeds a predetermined minimum value.

The engine support system includes a pair of forward engine mount assemblies 150 and 152 which are connected to the frame cross member 32 and a rear engine mount assembly 154 that is supported on a U-shape cantilever frame member 156 extending rearwardly from the frame cross member 34.

Figure 10:
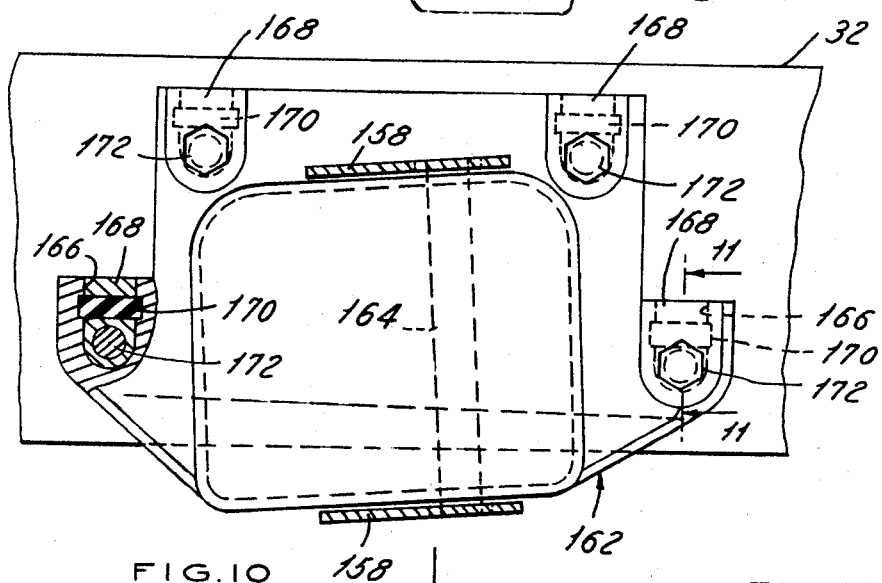
FIG. 10 is a sectional view of the left front engine support taken along section line 10—10 of FIG. 9.
Figure 11:
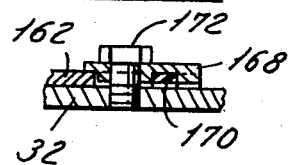
FIG. 11 is a sectional view of the break-away bracket fastener taken along section line 11—11 of FIG. 10.

FIGS. 10 and 11 disclose the construction of the left engine mount 150. The right mount 152 is similarly constructed. The left engine mount 150 includes a first bracket 158 that is secured to the vehicle engine 148 and a second bracket 162 that is secured to the frame cross member 32. The brackets 158 and 162 are connected by a single bolt 164 which is shown in phantom in FIG. 10.

The bracket 162 is secured to the frame cross member 32 by four break-away supports or fastener assemblies. Each fastener or support includes an open-ended slot 166 formed in the bracket 162. A metal piece 168 is fitted in the slot and locked in position by a shearable member 170. A bolt 172 passes through the metal piece 168 supporting the shearable member 170 to clamp the bracket 162 to the frame cross member 32.

During normal operation, the bracket 162 will be secured to the frame member 32 by the four bolts 172. In the event a major impact load is exerted against the front of the frame assembly 10, the inertia load of the engine 148 upon the engine bracket 162 will cause the shearable members 170 to fracture. The bracket 162 will then be free to slide forwardly with respect to the frame member 32 and the metal piece 168 normally seated in the U-shape slot 166. Fracture of the frangible members 170 releases the engine 148 to move forwardly (in the direction of arrow A) with respect to the frame assembly 10.

The right engine mount 152 is similarly constructed and arranged to that of the left mount 158 shown in FIGS. 10 and 11. Rubber elements may be provided in the engine mounts 150 and 152 to isolate engine noise and vibration from the vehicle frame 10 and body 114.

Figure 13:
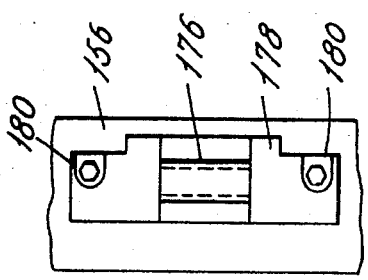
FIG. 13 is a top plan view of the rear engine mount shown in FIG. 12.
Figure 12:
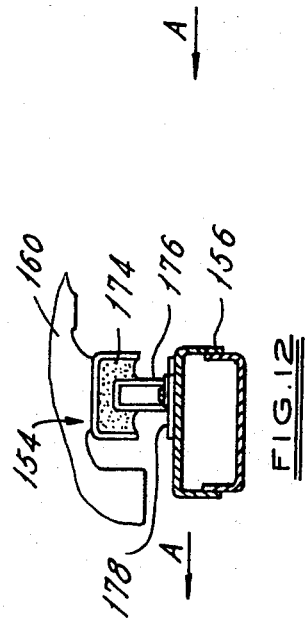
FIG. 12 is a side elevational view of the rear engine mount.
Figure 9:
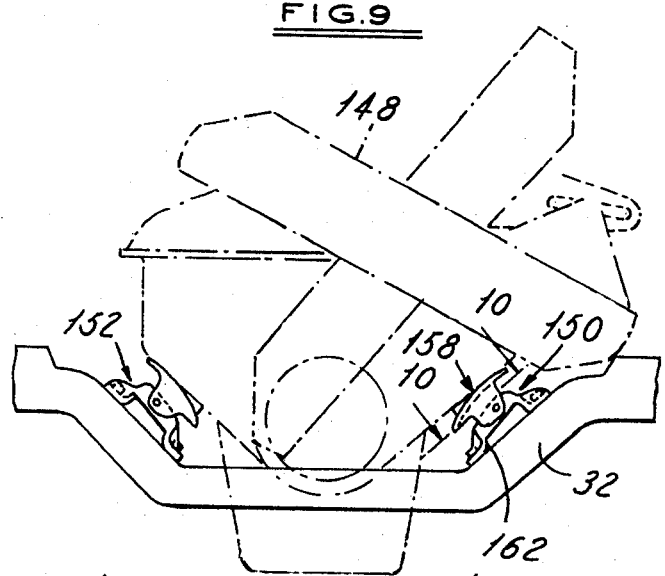
FIG. 9 is a front elevational view of the frame, the engine and the engine support system.

The rear engine mount is also of a break-away construction. Referring to FIGS. 12 and 13, the engine 148 is connected through a rubber block 174 to a bracket 176 supported on a plate 178. The plate 178 is connected to the frame component 156 by a pair of break-away fastener assemblies 180. The fastener assemblies 180 are each identical in construction and operation to the structure shown in FIG. 11 which secures the front engine mounts 150 and 152 to the frame member 32. The fastener assemblies 180 include shearable elements that permit the bracket structure 178 to separate from the frame member 156 and to move forwardly in the direction of arrow A (FIGS. 12 and 13) when a rearwardly directed impact load is exerted upon the forward end of the frame 10.

The slots 166, containing the fastener pieces 168 and frangible elements 170, open rearwardly. In the event a rearwardly directed impact load is directly imposed upon the engine 148, the intermediate fastener pieces 168 will engage the end of the slots 166 and prevent the engine mounts from being displaced rearwardly with respect to the frame assembly 10 and the engine 148 toward the body 114. Thus, the engine mounts do, in fact, constitute one-way break-away mounts.

OPERATION

The foregoing description presents an energy absorbing frame, a bumper support system, primary and secondary body support systems and a break-away engine mounting system. When a rearwardly directed impact load is exerted against the bumper bar 68 of a motor vehicle having the frame assembly 10, the energy absorbing structures and associated systems of this invention will operate in the following manner.

An impact load against the bumper bar 68 that is of a nominal value will cause the body portion of the hydraulic shock absorbers 64 and 66 to telescope rearwardly into the frame side rails 12 and 14. Energy will be absorbed by the reciprocation of the pistons connected to the end of the piston rods 82 through the fluid medium contained within the shock absorber assemblies 64 and 66.

In the event an impact load of substantial magnitude is imposed upon the bumper bar 68, the energy absorbers 64 and 66 will telescope into the side rails 12 and 14 to absorb the initial portion of the load. Assuming that the impact load exceeds the level that can be handled by the absorbers 64 and 66 and, further, that the load exceeds the maximum that the energy absorbing frame sections 52, 54, 60 and 62 of the forward frame rails 12, 14 can support, then these corrugated sections will crush or collapse. Due to the telescopic relationship provided by the energy absorber support tube 74 with respect to the guide tubes 84 and 88, the energy absorbing sections 52 and 60 will crush or collapse in a linear direction rather than buckling outwardly.

Thus, the shock absorbers 64 and 66 serve the dual purpose of absorbing the initial portion of an impact and of supporting the corrugated sections 60 and 62 during collapse. The shock absorbers 64, 66 cooperate with the guide tubes 84 and 88 to control the manner in which the left and right energy absorbing frame sections 52, 60 and 54, 62 collapse.

The vehicle body 114 is normally supported solely on rubber body mounts of the type indicated by reference numeral 118. These rubber mounts serve as a means of isolating road noise and vibration from the vehicle body.

Under a substantial impact load that exceeds a predetermined minimum, the mounts 118 will deflect and the vehicle body 114 will shift forwardly until the body supported V-blocks 130, 132 and 136 come into engagement with the frame supported V blocks 126, 128 and 134. Under these circumstances, the body 114 will become rigid with the frame assembly 10 at a location on the frame assembly rearwardly of the intermediate energy absorbing frame sections 104, 106 and of the forward energy absorbing sections 52, 54, 60 and 62. Under the effects of a major impact load, the corrugated frame sections 104 and 106 will collapse or crush along an axial line. The collapsing or crushing of these sections will be guided by the guide tubes 108 and 112 which will prevent the corrugated sections 104 and 106 from buckling outwardly.

The corrugated pleats which form the sides of the frame sections 104 and 106 will be plastically deformed under the impact load and their plastic deformation will absorb the load imposed upon the vehicle frame 10 by the inertia of the body 114.

As the frame sections 104 and 106 collapse, the distance between the torque boxes 20 and 22 and the rear of the frame where the V-shape blocks are secured will shorten. This will cause the T-bolts 120 and 122 to move along the guide slots 124 in the body side sills 116. The T-bolts 120 and 122 in engagement with the body side sills 116 will prevent the body 114 from being displaced upwardly. The T-bolts 120 and 122 will hold the body 114 upon the frame 10 while permitting the corrugated sections 104 and 106 to collapse and absorb the energy of the impact.

The torque boxes 20 and 22 provide a rigid interconneconnection between the forward side rails 12 and 14 and the intermediate side rails 16 and 18. The torque boxes 20 and 22, in association with the frame cross members (such as member 34) assist the linear deformation of the intermediate energy absorbing frame sections 104 and 106. The rigidity provided to the frame assembly 10 by the torque boxes 20 and 22 and the frame cross members prevents a force couple from being imposed on the energy absorbing frame sections 104 and 106 when a major impact strikes the bumper bar 68 that might otherwise cause the sections 104 and 106 to be bowed outwardly.

The disclosed engine mounting system removes the inertia load of the engine 148 from the energy absorbing sections of the frame 10 during a major impact.

In the event an impact load is exerted against the forward end of a moving vehicle having this engine mounting system, the inertia load of the engine 148 will stress the shearable elements 170 in the forward engine mounts 150 and 152 and in the rear mount 154. If the stress levels exceed the predetermined minimum of the several shearable elements 170, the elements 170 will fracture and inertia will cause the engine 148 to separate from the frame components 32 and 156. The engine 148 and its associated drivetrain components will be free to move forwardly with respect to the frame assembly 10. In this event, the several energy absorbing portions of the frame will not have to bear the inertia load of the engine mass.

If the rearwardly directed impact load is directly imposed upon the engine 148, the intermediate metal pieces 168, being in engagement with the end of the slots 166, will prevent the engine mounts and the engine from being displaced rearwardly toward the vehicle body 114.

In accordance with the present invention, an energy absorbing vehicle system is provided having means for absorbing various levels of impact load. Such means includes telescopic shock absorbers for absorbing minor loads exerted against the bumper bar and plastically deformable frame sections constructed to absorb major loads. A dual body mounting system is provided which permits isolation of the vehicle body from the frame under normal conditions and a rigid interconnection under an impact load so that the body may be decelerated at a controlled rate by deformation of energy absorbing frame structure. The vehicle system may include break-away mounts whereby the inertia load of the engine need not be supported by the plastically deformable frame sections.

The foregoing description presents the presently preferred embodiment of this invention. Modifications and alterations may occur to those skilled in the art that will come within the scope and spirit of the following claims.

We claim:

1. An energy absorbing system for a motor vehicle comprising:
   a vehicle frame assembly having plastically deformable energy absorbing frame sections,
   a vehicle body and body mounting means supporting said body on said frame assembly,
   a vehicle engine and one-way break-away engine mounting means connecting said engine to said frame assembly,
   said engine mounting means and said body mounting means being constructed to support said engine and said body, respectively, on said frame assembly during normal vehicle operating conditions,
   said engine mounting means including frangible means and abutment means,
   said frangible means being constructed to fracture and permit the forward displacement of said engine with respect to said frame assembly under the effects of a rearwardly directed impact force imposed upon said frame assembly that equals a predetermined magnitude,
   said body mounting means being constructed to support said body on said frame assembly under the effects of a rearwardly directed impact force on said frame assembly that at least equals said predetermined magnitude whereby said energy absorbing frame sections support the mass of said vehicle body but not the mass of said engine when a rearwardly directed force of said predetermined magnitude is imposed upon said frame assembly,
   said abutment means being operatively interposed between said engine and said frame assembly and constructed to support said engine on said frame assembly against a force tending to displace said engine rearwardly with respect to said frame assembly that at least equals said predetermined magnitude.

2. An energy absorbing system for a motor vehicle comprising:
   a vehicle frame assembly having plastically deformable energy absorbing sections,
   a vehicle body supported on said frame assembly rearwardly of said energy absorbing sections,
   a vehicle engine and break-away mounting means connecting said engine to said frame assembly,
   said mounting means comprising a plurality of brackets secured to said engine,
   said brackets having rearwardly opening slots,
   fastener means disposed in said slots and secured to said frame,
   frangible means operatively interposed between said fastener means and said brackets,
   said frangible means being constructed to fracture under a load exceeding a predetermined minimum value tending to cause the forward displacement of said engine with respect to said frame assembly,
   said fastener means being constructed to support said engine against rearward displacement with respect to said frame assembly when subjected to a load substantially exceeding said first mentioned load required to fracture said frangible means.

* * * * *